United States Patent
Ash et al.

(10) Patent No.: US 7,561,519 B1
(45) Date of Patent: Jul. 14, 2009

(54) PNNI-BASED MULT-LINK SHORTEST PATH CLASS-OF SERVICE ROUTING TECHNIQUE

(75) Inventors: Gerald Richard Ash, West Long Branch, NJ (US); Jiayu Chen, Morganville, NJ (US); Saul Daniel Fishman, Edison, NJ (US); Anurag S. Maunder, Scotch Plains, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 633 days.

(21) Appl. No.: 10/744,722

(22) Filed: Dec. 23, 2003

Related U.S. Application Data

(63) Continuation of application No. 09/538,007, filed on Mar. 29, 2000, now Pat. No. 6,778,535.

(51) Int. Cl.
  *H04J 1/16* (2006.01)
  *H04J 3/14* (2006.01)
  *H04L 1/00* (2006.01)
  *H04L 12/26* (2006.01)
  *H04L 12/28* (2006.01)

(52) U.S. Cl. .................... 370/235; 370/230.1; 370/231; 370/238; 370/351

(58) Field of Classification Search ......... 370/229–231, 370/235, 238, 238.1, 351
See application file for complete search history.

(56) References Cited

U.S. PATENT DOCUMENTS

| 5,392,344 | A | 2/1995 | Ash et al. |
| 6,496,480 | B1 * | 12/2002 | Ash et al. ................. 370/238.1 |
| 6,600,724 | B1 * | 7/2003 | Cheng ......................... 370/256 |

* cited by examiner

*Primary Examiner*—Ronald Abelson

(57) ABSTRACT

The present invention concerns a technique for providing Class-of-Service Routing in an ATM network (10) that utilizes the Private Network-Network Interface (PNNI) protocol. An originating node seeking to route a call to a terminating node does so by initially determining the class-of-service and then selecting a shortest length path there-between. Each successive link on the selected path is examined for sufficient available bandwidth and available depth (i.e., bandwidth not reserved for other services) for the Class-of-Service of the call. If every link possesses sufficient available bandwidth, then the call passes on the selected path. Otherwise, should a link on the selected path lack sufficient bandwidth and available depth, then a crankback message is sent to the originating node, and the originating node selects the next shortest path. Thereafter, the process of examining each link for sufficient bandwidth is repeated. If no path is found, the call is ultimately blocked.

6 Claims, 2 Drawing Sheets

PNNI-BASED MULT-LINK SHORTEST PATH CLASS-OF SERVICE ROUTING TECHNIQUE

CROSS-REFERENCE TO RELATED APPLICATION

This application is a continuation of U.S. application Ser. No. 09/538,007, filed Mar. 29, 2000 now U.S. Pat. No. 6,778, 535.

TECHNICAL FIELD

This invention relates to a technique for routing calls in a data communications network that employs the Private Network-to-Network Interface protocol.

BACKGROUND ART

Routing is the network process by which a call or other connection request proceeds (connects) from an origin to a destination. Concerns about routing lie at the heart of the architecture, design, and operation of any network. Current and future networks are rapidly evolving to carry a multitude of voice/ISDN services and packet data services over time division multiplexing (TDM), asynchronous transfer mode (ATM), and Internet protocol (IP). The long awaited data revolution is occurring, with the extremely rapid growth of data services such as frame relay, IP multimedia, and B-ISDN ATM services. Different routing methods have evolved for services supported by the TDM, ATM, and IP protocols. These protocols will continue to exist simultaneously and thus the need will continue to interwork in most networks. In other words, there has not been nor will there probably ever be a universal homogeneous network solution.

Among the various routing techniques used for ATM networks is the Private Network-Network Interface (PNNI) strategy adopted by the ATM Forum. The PNNI routing strategy provides interoperability among different vendor equipment and scaling to very large networks. Scaling is provided by a hierarchical peer group structure that allows the details of topology of a peer group to be flexibly hidden or revealed at various levels within the hierarchical structure. Peer group leaders represent the switches within a peer group for purposes of routing protocol exchanges at the next higher level. Border switches handle inter-level interactions at call setup. PNNI routing involves two components: a) a topology distribution protocol, and b) the path selection and crankback procedures. The topology distribution protocol floods information within a peer group. The peer group leader abstracts the information from within the peer group and floods the aggregated reachable address information. As the peer group leader learns information at the next higher level, it floods it to the lower level in the hierarchy, as appropriate. In this fashion, all switches learn the network reach and topology.

Traditionally, providers of telecommunications services have offered different grades or classes of service (COS) based on customer demand. To meet quality objectives for such different grades of service, telecommunications providers, such as AT&T, have employed Class-of-Service routing techniques in traditional circuit switched networks. U.S. Pat. No. 5,392,344, issued in the name of Gerald R. Ash et al., on Feb. 21, 1995, and assigned to AT&T (incorporated by reference herein) describes and claims such a Class-of-Service routing technique. Unfortunately, Class-of-Service routing does not exist with present day PNNI networks. Thus, there is a need for a PNNI Class-Of-Service routing technique.

BRIEF SUMMARY OF THE INVENTION

Briefly, the present method provides Class-of Service routing for a call or other connection request from an origin node to a destination node in a multi-link network employing the PNNI protocol. In accordance with a preferred embodiment, the method commences by determining the class-of-service and then searching for a shortest path between the origin and the destination. Upon finding such a path, a check is then made whether each link in the path has available bandwidth and available depth (i.e., bandwidth capacity not reserved for other services) for the class of service associated with the connection request. If each link has sufficient available bandwidth, then the call is routed from the origin to the destination via the shortest path. Otherwise, if any of the links in the path lack available bandwidth and depth for the class of service associated with the call, then a message, typically in the form of a crankback message, is sent back to the origin node, prompting the origin node to repeat the process of selecting a shortest path, and checking each link within that path for available bandwidth.

DETAILED DESCRIPTION

Figure 1:
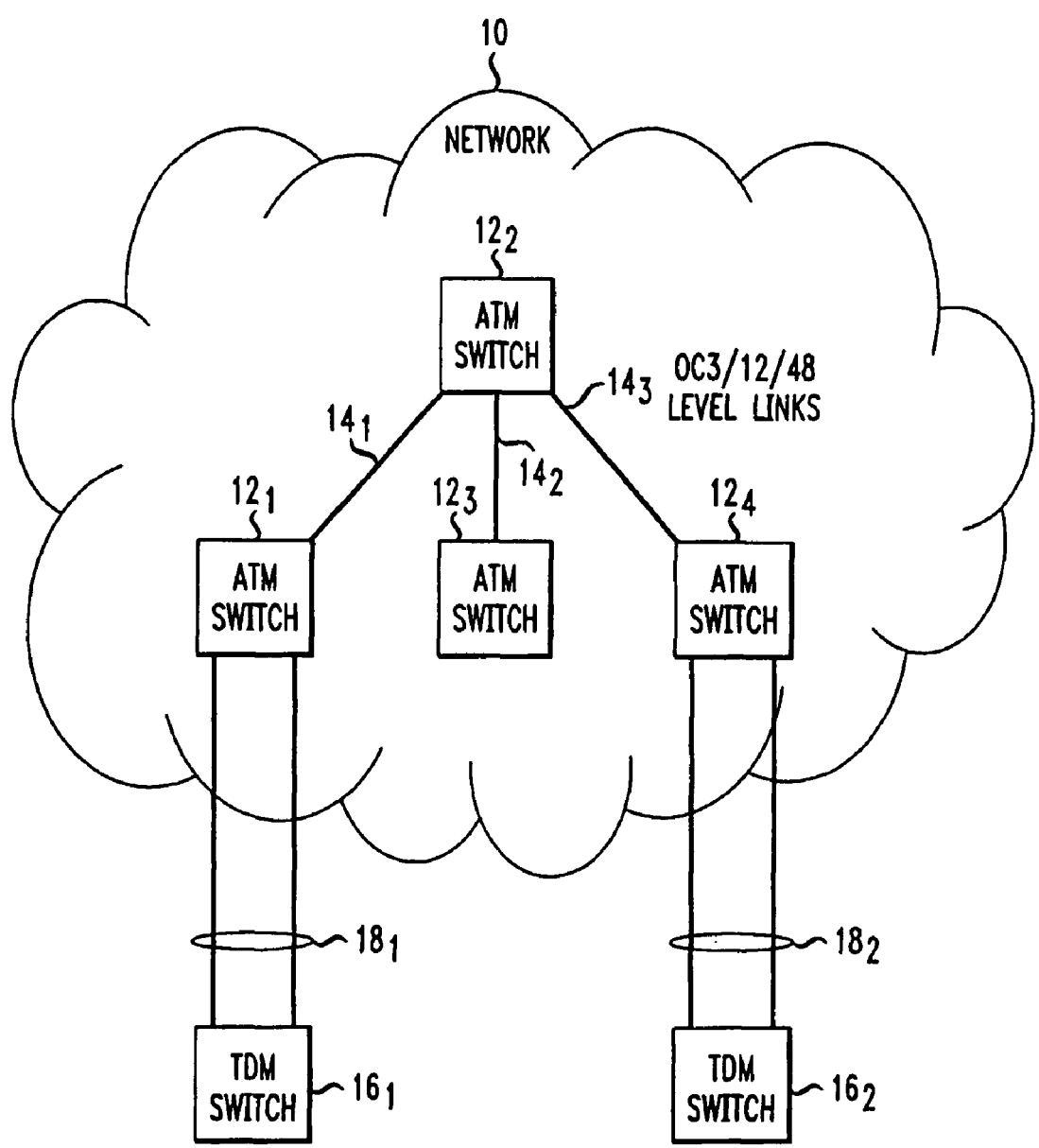
FIG. 1 shows a block schematic diagram of a network, according to the prior art, comprised of ATM and TDM switches.

FIG. 1 shows a prior art network 10 employing the PNNI protocol. In the illustrated embodiment, the network comprises of a plurality of ATM switches, shown illustratively by ATM switches $12_1$, $12_2$, $12_3$ and $12_4$. Each of the ATM switches may comprise an ATM switch made by manufacturers such as Lucent and Nortel, for example. A plurality of links illustratively depicted as links $14_1$, $14_2$, and $14_3$, link selective switches. In practice, at least a small fraction of the links $14_1$-$14_3$ possess OC3/12/48 data transmission capability, yielding a sparse network topology. As shown in FIG. 1, the network 10 also includes a plurality of TDM switches, shown illustratively by switches $16_1$ and $16_2$. Each of switches $16_1$ and $16_2$ is linked or "homed" to the closest one of the ATM switches $12_1$-$12_4$ via links $18_1$ and $18_2$ that typically each possess DS3 data transmission capacity.

In accordance with the invention, calls or other connection requests (hereinafter collectively referred to as calls) are routed from an origin node to a destination node using a novel routing scheme that takes account of the Class of Service of the call. In practice, different calls may have different classes of service based on priority. For example, call priority may be key, normal or best effort. The priority of the call is determined from a variety of factors, including the called party number, TCAP signaling information, the type of origin and destination of the call, and the ATM class of service, typically defined in terms of Constant Bit Rate (CBR), Variable Bit Rate (VBR) and Unspecified Bit Rate (UBR). Once the class of service and priority are determined, the originating switch selects the path through the network along one or more of the links $14_1$, $14_2$ and $14_3$, based on the allowed Depth of Search (DoS) for the call priority, as discussed below, and on the load state of the network. (Note that the terms "switch" and "node"

are used interchangeably in this disclosure). Once the originating switch determines that the call will be admitted to the network, each subsequent switch lying along the path to the destination checks the required bandwidth and allowed DoS.

Figure 2:
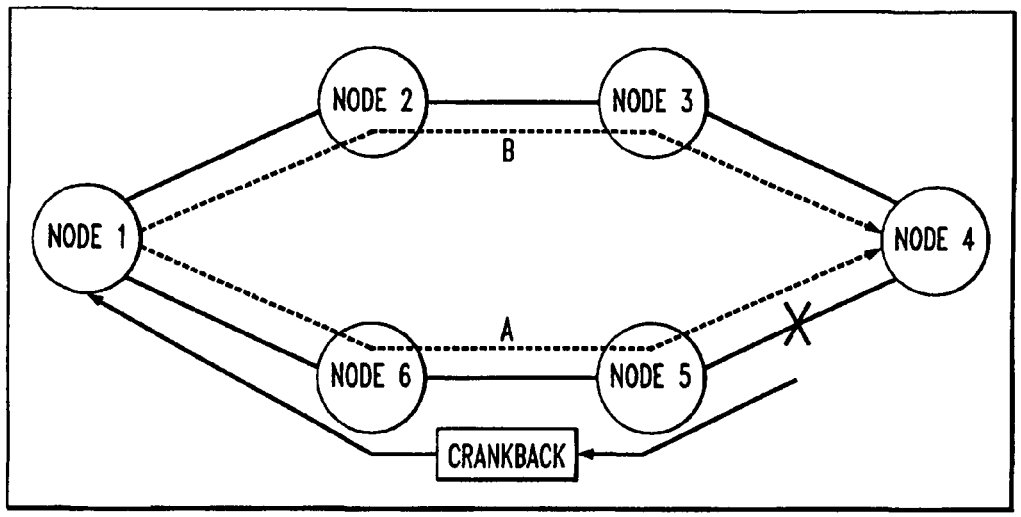
FIG. 2 shows a call flow within the network 1 using the Class-of-Service routing method of the invention.

FIG. 2 graphically illustrates a call flow within the network 10 using the Class of Service routing technique of the invention. For purposes of discussion, assume that a call originates at node 1 and is destined for node 4. In accordance with the PNNI protocol, the originating node 1 will establish the shortest path, which may for example be the shortest hop path with the minimum total cost metric. If the shortest hop path is found, then in accordance with the invention, then a check is made to determine the Class-of-Service of the call. From knowledge of the Class-of-Service of the call, a check is made for available bandwidth using the Class-of-Service Criterion discussed below for this shortest path. If available bandwidth exists on the shortest path, then the call is allocated to this path.

As seen in FIG. 2, the shortest multi hop path is selected, which as seen in FIG. 2 comprises path A that passes through via nodes 6 and 5 before reaching destination node 4. Having selected Path A, the origin node checks whether available bandwidth exists for the Class-of-Service of the call on the link from node 1 to node 6. If so, then node 6 looks for available bandwidth on the link to node 5 in a similar manner. In turn, via node 5 looks for available bandwidth on the link to the destination node 4 in a similar manner. The search depth passes from each node to a successive downstream path in the set-up message. If any node along the selected path ascertains that an intermediate link, for example, the link between nodes 5 and 4, lacks sufficient bandwidth, then a crankback is sent back to the originating node 1 to select another path. The originating node 1 then selects the next shortest path, say path B in FIG. 2., and repeats the above-described process.

Figure 3:
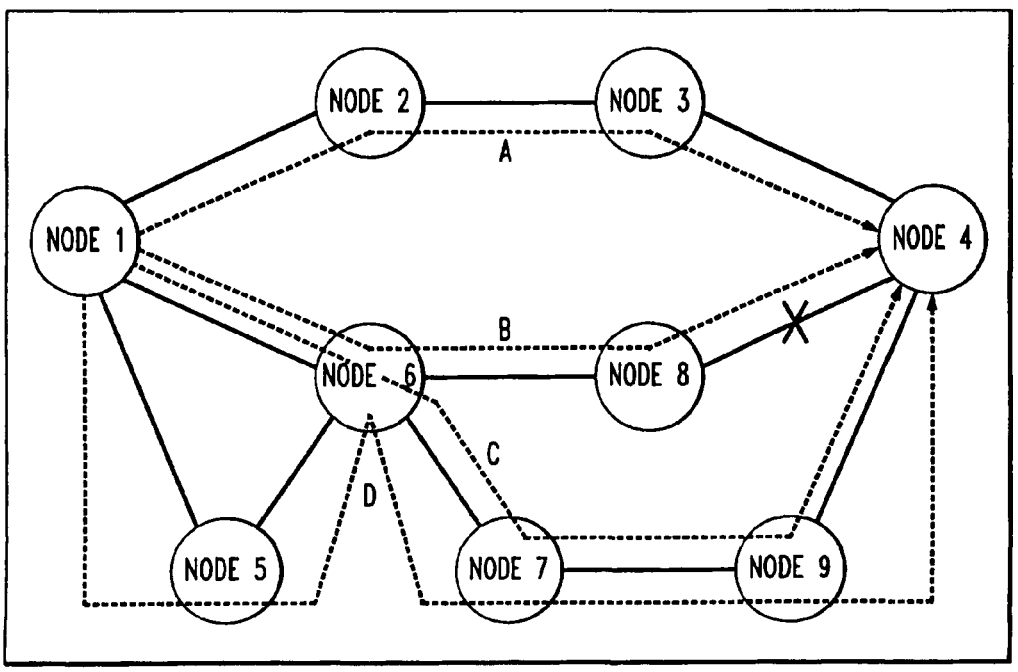
FIG. 3 shows a call flow in the network using Class-of-Service routing method of the invention together with a method for establishing the shortest link path between nodes.

FIG. 3 illustrates the path selection process in somewhat more detail. As discussed earlier, when node 1 receives a call destined for node 4, node 1 searches for the shortest path. Assuming that paths A and B are the shortest (each having an administrative weight of one), the originating node will select a path (e.g., path A) for example in fixed order, sequentially in terms of subsequent paths. Thus, the originating node will pick path A, but if any link lacks sufficient bandwidth, then the originating node 1 selects path B. If any link in path B lacks sufficient bandwidth, then the originating node 1 selects path C and so on. Between paths that are of equal length, the path having the lowest administrative weight is selected.

To determine requisite depth, a Bandwidth in Progress (BWIP) indication is established at the start of the call or other connection request. To that end, two quantities: Bandwidth Peg Count (BWPC) and a Bandwidth Overflow Count (BWOV) are kept for each link connecting a switch pair. During a given interval of X minutes, each switch tracks for each link to another switch the following quantities:

BWPC=Sum of all Bandwidth (BW) required on a link for each Virtual Channel (VC) setup for calls on their first choice path; and BWOV=Sum of BW required for each blocked VC setup on a link included in BWPC that was blocked.

At the end of a prescribed period, typically three minutes, the Link Blocking Level (LBL) is computed

LBL=BWOV/BWPC

Each switch also maintains the following two Depth parameters for each virtual network:

BWavg$_{vk}$, the Bandwidth required for each Virtual Network$_v$ (VN$_v$) and node-pair k to carry the average Bandwidth-In-Progress (BWIP$_{vk}$) [=Erlang Load$_{vk}$×Avg BW$_{vk}$/Virtual Channel$_{vk}$] and BWmax$_{vk}$, the Bandwidth required to meet the blocking probability Grade-of-Service objective=[TREBS(Erlang Load$_{vk}$, Grade-of-Service(GOS))×Avg BW$_{vk}$/VC$_{vk}$]

In practice, BWavg$_{vk}$ and BWmax$_{vk}$ are computed at prescribed intervals, typically weekly. Different values of BWavg$_{vk}$ and BWmax$_{vk}$ may be used for different periods of the day (e.g., business peak, residence peak).

Four different blocking reservation thresholds (BR1, BR2, BR3, BR4) are used, for example, where 0%≦BR1≦BR2≦BR3≦BR4≦100%. The reservation level N is 0 if BR1 is not exceeded, N=1 if BR1 is exceeded but not BR2, N=2 if BR2 is exceeded but not BR3, N=3 if BR3 is exceeded but not BR4, and N=4 if BR4 is exceeded. This relationship is depicted in Table I.

TABLE I

Determination of Reservation Level (N)

| N | Condition |
|---|---|
| 0 | LBL < BR1 |
| 1 | BR1 ≦ LBL < BR2 |
| 2 | BR2 ≦ LBL < BR3 |
| 3 | BR3 ≦ LBL < BR4 |
| 4 | BR4 ≦ LBL |

A link is considered in a busy (B) state if the Idle Bandwidth (ILBW) less than the equivalent bandwidth (EQBW) required for the call. A link is considered in a reserved (R) state if the ILBW is less than or equal to a Reserved Threshold (Rthr), as defined below. The link is considered in the Heavily Loaded (HL) state if the Idle Bandwidth is less than or equal to a Heavily Loaded threshold (HLthr) for the link but more than Rthr. Conversely, the link is considered Lightly Loaded (LL) if the Idle Bandwidth for each link in the path is greater than HLthr for the link. This relationship is best depicted in Table II (here we have omitted, for simplicity, the subscripts k denoting the link for each variable):

TABLE II

Load State Condition

| Name of State | Condition |
|---|---|
| Busy B | ILBW < EQBW |
| Reserved R | EQBW ≦ ILBW ≦ Rthr |
| Heavily Loaded HL | Rthr < ILBW < HLthr |
| Lightly Loaded LL | HLthr < ILBW |

The Reservation Threshold Rthr and Heavily Loaded Threshold HLthr are given by the relationships Rthr=N×0.05×TBW HLthr=Rthr+0.05×TBW where N is the reservation level based on the Blocking Reservation thresholds (BR1, BR2, BR3, and BR4) and TBW is the total bandwidth required on a link to meet the blocking probability Grad of Service (GOS) objective for calls of their first choice route.

The Depth-of-Search (DoS) for a call to use various Load States depends on the Bandwidth-In-Progress (BWIP$_v$), the BWavg$_v$ and BWmax$_v$ thresholds, the priority of the call or other connection, and whether the path is the first choice path or alternate path, as illustrated in Table III (here again we have omitted, for simplicity, the subscripts k denoting the node-pair for each variable):

TABLE III

DoS CRITERION

| | | Normal Service | | |
|---|---|---|---|---|
| Load State Allowed$_v$ | Key Service | First Choice Path | Alternate Path | Best Effort Service |
| R | if BWIP$_v$ ≦ 2 × BWmax$_v$ | if BWIP$_v$ ≦ BWavg$_v$ | Not Allowed | Not Allowed |
| HL | if BWIP$_v$ ≦ 2 × BWmax$_v$ | if BWavg$_v$ < BWIP$_v$ ≦ BWmax$_v$ | if BWIP$_v$ ≦ BWavg$_v$ | Not Allowed |
| LL | All BWIP$_v$ | All BWIP$_v$ | All BWIP$_v$ | All BWIP$_v$ |

The originating switch determines the allowed DoS for the call or other connection according to Table III. The originating switch first attempts to route the call on shortest path to the terminating switch.

For a key service call:
If BWIP$_v$ ≦ 2×BWmax$_v$, then all load states are allowed.
If BWIP$_v$ > 2×BWmax$_v$, then only LL links are allowed.
For a normal service call:
If BWIP$_v$ ≦ BWavg$_v$, then all load states are allowed on the first choice path and the HL and LL states are allowed on alternate paths
If BWavg$_v$ < BWIP$_v$ ≦ BWmax$_v$, then only HL and LL states are allowed on the first choice path and LL state is allowed on alternate paths
If BWIP$_v$ > BWmax$_v$, then only the LL links are allowed are on first choice and alternate paths
For a best effort service call only LL links are allowed.

If the originating switch fails to find a path to the destination switch and there are other terminating switches that can also complete the call, then the originating switch uses the same PNNI-based method to route the call to a subsequent terminating switch. Otherwise, the call is blocked.

If the originating switch finds a path to the terminating switch, the call is set up to the next hop in the computed path. The originating switch routes the call to an intermediate switch and passes the bandwidth requirement and depth of search to the intermediate switch in the Setup signaling message. The intermediate switch routes the call to the terminating switch or a next intermediate switch if the required bandwidth is available and the load state of the link from the intermediate switch to the terminating switch or the next intermediate switch is allowed. Otherwise, the intermediate switch returns call control to the originating switch using the crankback message. Upon receipt of the crankback message, the originating switch can route advance to other eligible paths.

Typically, in PNNI protocol networks, link bandwidth is among the initial route selection criteria whereas, it is expensive in terms of processing overhead to flood frequent changes in link bandwidth availability to all nodes in the network. Therefore, thresholds such as the Available Cell Rate Proportional Multiplier can be set to minimize the flooding of nodes in response to changes in link bandwidth. In this way, the shortest path route between any two pair of switches will remain a fixed sequential list of paths.

The above-described embodiments merely illustrate the principles of the invention. Those skilled in the art may make various modifications and changes that will embody the principles of the invention and fall within the spirit and scope thereof.

What is claimed is:

1. A method for providing Class-of-Service (COS) routing of a call or connection request between an origin node and a destination node in a multi-link network employing a Private Network-to-Network Interface (PNNI) protocol, comprising the steps of:
    (a) searching for a shortest path between the origin and destination nodes, then;
    (b) determining the class of service of the call;
    (c) determining for each link in the path, on a link-by-link basis, whether each link has available bandwidth for the Class of Service for the call by performing the steps of:
        1) measuring actual bandwidth on said link over a prescribed interval;
        2) determining Node-to-Node blocking in accordance with the actual bandwidth;
        3) establishing reservation thresholds in accordance with the Node-to-Node blocking;
        4) determining the load state of the link in accordance with the bandwidth reservation thresholds; and
        5) establishing the availability of the link in accordance with the class of service of the connection request, the Load State of the link, and a required bandwidth for the connection request class of service, and
    if said each link in the shortest path has sufficient bandwidth, then routing the call to the destination node across the shortest path, otherwise,
    (d) if insufficient bandwidth is available on any of the links, then sending a crankback message to the origin node; thereafter searching for a next shortest path and then repeating step (c).

2. The method according to claim 1 wherein the step of searching for the shortest path includes the step of searching a fixed list of shortest paths in sequential order from the shortest path to the longest path.

3. The method according to claim 1 wherein the required bandwidth for the call class of service is established weekly.

4. The method according to claim 3 wherein the call connection classes of service include key service, normal service and best effort service.

5. The method according to claim 4 wherein the class of service is determined from at least one of: (a) called party number, (b) TCAP signaling information, (c) the type of origin and destination of the call and (d) ATM class of service.

6. The method according to claim 1 wherein each link may have one of a Reserved, Lightly Loaded, or Heavily Loaded, or Busy load states.

* * * * *